US00RE43896E

(19) United States
(12) Reissued Patent
Keaton et al.

(10) Patent Number: US RE43,896 E
(45) Date of Reissued Patent: Jan. 1, 2013

(54) IMAGE AND VIDEO INDEXING SCHEME FOR CONTENT ANALYSIS

(75) Inventors: Patricia A. Keaton, Porter Ranch, CA (US); Rodney M. Goodman, Altadena, CA (US)

(73) Assignee: California Institute of Technology, Pasadena, CA (US)

(21) Appl. No.: 12/152,827

(22) Filed: May 16, 2008 (Under 37 CFR 1.47)

Related U.S. Patent Documents

Reissue of:
(64) Patent No.: 7,046,851
Issued: May 16, 2006
Appl. No.: 10/045,640
Filed: Nov. 8, 2001

U.S. Applications:
(60) Provisional application No. 60/247,469, filed on Nov. 8, 2000.

(51) Int. Cl.
*G06K 9/00* (2006.01)

(52) U.S. Cl. ..... 382/218; 382/125; 382/157; 382/232; 382/305; 707/999.006; 707/999.101

(58) Field of Classification Search ..... 382/157, 382/218, 224, 232, 233, 240, 305, 125; 707/6, 707/9, 10, 101, 999.006, 999.101; 715/716, 715/722
See application file for complete search history.

(56) References Cited

U.S. PATENT DOCUMENTS 4,025,851 A 5/1977 Haselwood et al.
4,905,296 A 2/1990 Nishihara
5,065,447 A * 11/1991 Barnsley et al. ..... 382/249
5,524,066 A 6/1996 Kaplan et al.
5,557,689 A 9/1996 Huttenlocher et al.
5,594,503 A * 1/1997 Miyazawa ..... 348/414.1
5,602,979 A 2/1997 Loop
5,768,437 A * 6/1998 Monro et al. ..... 382/249
5,812,999 A 9/1998 Tateno
5,913,205 A 6/1999 Jain et al.
5,987,459 A 11/1999 Swanson et al.
5,991,734 A 11/1999 Moulson
6,014,466 A * 1/2000 Xia et al. ..... 382/243
6,041,147 A * 3/2000 Mead ..... 382/305
6,184,897 B1 2/2001 Gueziec et al.
6,253,189 B1 6/2001 Feezell et al.
6,256,038 B1 7/2001 Krishnamurthy
6,313,837 B1 11/2001 Assa et al.

(Continued)

OTHER PUBLICATIONS

"Hidden-Variable Fractal Interpolation of Discrete Sequences." ICASSP Conference Apr. 1991 pp. 3393-3396.*

(Continued)

*Primary Examiner* — Gregory M Desire
(74) *Attorney, Agent, or Firm* — Brundidge & Stanger, P.C.

(57) ABSTRACT

The present invention provides an image and video indexing scheme for content analysis. According to the invention, a database of images or videos is compressed. By examining patterns in the compression scheme of each image or video, the present invention identifies the content of the data. In one embodiment, an unsupervised learning method is employed where each image or video is sub-divided into smaller blocks (8 pixels×8 pixels, for instance) and each of the smaller blocks is examined for its compression pattern. Then, the patterns associated with each of the smaller blocks is recorded for each of the images in the database and content is retrieved from the database by associating certain patterns or groups of patterns with certain content.

49 Claims, 10 Drawing Sheets

U.S. PATENT DOCUMENTS

| | | | | |
|---|---|---|---|---|
| 6,389,168 | B2 | 5/2002 | Altunbasak et al. | |
| 6,466,696 | B1 | 10/2002 | Politis | |
| 6,594,310 | B1 | 7/2003 | Marques et al. | |
| 6,624,844 | B1 * | 9/2003 | Manbeck et al. | 348/97 |
| 6,661,527 | B1 | 12/2003 | Shibao | |
| 6,665,444 | B1 * | 12/2003 | Kajiwara | 382/240 |
| 6,694,311 | B1 | 2/2004 | Smith | |
| 6,714,909 | B1 | 3/2004 | Gibbon et al. | |
| 6,728,314 | B2 | 4/2004 | Kan et al. | |
| 6,760,042 | B2 | 7/2004 | Zetts | |

OTHER PUBLICATIONS

"Advisory Action", U.S. Appl. No. 09/765,772, (Aug. 13, 2003).
"Final Office Action", U.S. Appl. No. 09/765,772, (Mar. 12, 2003).
"Final Office Action", U.S. Appl. No. 09/765,772, (Apr. 27, 2004).
"Non Final Office Action", U.S. Appl. No. 09/765,772, (Oct. 17, 2003).
"Non Final Office Action", U.S. Appl. No. 09/765,772, (Aug. 28, 2002).
"Non Final Office Action", U.S. Appl. No. 10/045,640, (Dec. 1, 2004).
"Notice of Allowance", U.S. Appl. No. 09/765,772, (Mar. 11, 2005).
"Notice of Allowance", U.S. Appl. No. 10/045,640, (Jan. 23, 2006).
"Notice of Allowance", U.S. Appl. No. 10/045,640, (Jul. 12, 2005).
Bozinovic, Radmilo M., et al., "Off-Line Cursive Script Word Recognition", *IEEE Trans. on Pattern Analysis and Machine Intelligence*, vol. 11, No. 1, (Jan. 1989), pp. 66-83.
"Final Office Action", U.S. Appl. No. 10/977,555, (May 7, 2007), 9 pages.
"Non-Final Office Action", U.S. Appl. No. 10/066,100, (Apr. 28, 2004), 10 pages.
"Non-Final Office Action", U.S. Appl. No. 10/066,100, (Nov. 10, 2003), 8 pages.
"Non-Final Office Action", U.S. Appl. No. 10/977,555, (Mar. 13, 2006), 6 pages.
"Non-Final Office Action", U.S. Appl. No. 10/977,555, (Aug. 10, 2005), 8 pages.
"Non-Final Office Action", U.S. Appl. No. 10/977,555, (Sep. 28, 2006), 6 pages.
"Notice of Allowability", U.S. Appl. No. 10/066,100, (Mar. 24, 2005), 3 pages.
"Notice of Allowability", U.S. Appl. No. 10/977,555, (Aug. 27, 2007), 3 pages.
Guskov, Igor et al., "Hybrid Meshes: Multiresolution Using Regular and Irregular Refinement", Submitted for publication in SIGGRAPH 2002, (Jun. 5-7, 2002), 9 pages.
Velho, Luiz et al., "Semi-Regular 4-8 Refinement and Box Spline Surfaces", IMPA—Instituto de Matematica Pura e Aplicada, (Dec. 1999), 10 pages.
USPTO; Final Office Action dated Mar. 29, 2011 in U.S. Appl. No. 12/151,152.
USPTO; Office Action dated Jul. 15, 2011 in U.S. Appl. No. 12/151,152.

* cited by examiner

IMAGE AND VIDEO INDEXING SCHEME FOR CONTENT ANALYSIS

Matter enclosed in heavy brackets [ ] appears in the original patent but forms no part of this reissue specification; matter printed in italics indicates the additions made by reissue.

This application claims priority of U.S. Provisional Application No. 60/247,469, filed on Nov. 8, 2000. This provisional patent application is hereby incorporated herein by reference.

BACKGROUND OF THE INVENTION

1. Field of the Invention

The present invention relates to image and video storage and retrieval systems.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

2. Background Art

Computer systems are used to store large amounts of information and data. To be useful, it is important that the data be organized and searchable so that data and information can be easily found. For text data it is relatively easy to search for data by searching for key words that might be found in the text of stored documents. Thus, the stored data itself can be used as part of the searching effort. It is not as easy to search for images on computer systems because of the way that they are stored. Images are stored, in one example, as a series of pixels that indicate a particular color. There is nothing about the pixel that lets a searcher know if it is a part of a picture of a car or a bird. Thus, the image data itself has not been easily usable as part of the searching effort.

One method for making it easier to search for images is the use of captions or text descriptions associated with the image that themselves are searchable. For example, a picture of a car on a bridge could have a caption describing the scene with the car, bridge, background, etc. all described in text. When a person searches for an image, the person enters words that are then used to search through image captions. This scheme requires that each image be looked at and described by a human operator, a time consuming effort and one that adds to the amount of data needed to be stored with each image, so it is space consuming as well. This type of system is called a content-based retrieval system.

Another type of image and video storage and retrieval system uses a compressed domain approach. The compressed domain approach derives the image or video features from the transform coefficients, thus requiring decompression.

The problems associated with image indexing and retrieval systems can be better understood by a review of content-based retrieval systems and compressed domain systems.

Content Based Retrieval—Keyword Approach

One type of content based retrieval system uses keywords. Typically, keywords describing each image are recorded in text and associated with the image. (This additional data, which in part describes the image, is often referred to as "meta-data"). When a user wishes to retrieve the image, a keyword is typed and all of the images having that associated keyword are retrieved. This requires great human effort in creating the meta-data that enables visual queries. The text descriptions also do not completely or consistently characterize the content of the images and videos. Second, the relatively large data sizes of images and videos compared to the communication channel bandwidth prohibits the user from browsing or perusing all but a small portion of the archive at a time. Therefore, the ability to find desired images and videos depends primarily on the capabilities of the query tools provided by the system.

Content Based Retrieval—Query Approach

Using a content-based query, the user provides a description of some of the prominent visual features of an image or video. Then, a mechanism is enabled by which the computer searches the archive and returns the images and videos that best match the description. Typically, research on content-based queries have focused on the visual features of color, texture and shape. For example, the IBM Query By Image Content (QBIC) project proposes and utilizes feature sets that capture the color, texture and shape of image objects that have been segmented manually. Texture and color features are also utilized that describe the global features of images.

The keyword based and query based approaches to content based retrieval store the keywords or visual features in addition to the compressed imagery. This produces a data expansion, which is disadvantageous.

Compressed Domain Retrieval

The advent of compression standards has led to the proliferation of indexing techniques in the compressed domain. Many images and videos in a networked multimedia database are of a compressed nature. Compressed domain techniques seek to identify and retrieve the images by processing data in the compressed representation of the images. The main advantage of compressed domain processing is the reduction of computational complexity which results from the smaller size of the compressed data file.

Compressed domain techniques, however, derive the features of the images or videos from their transform coefficients. This requires the decompression of the bit-stream up to an inverse transformation step, which is disadvantageous. There is currently no approach that minimizes the data expansion associated with content based retrieval and also minimizing the decompression associated with compressed domain approaches.

SUMMARY OF THE INVENTION

The present invention provides an image and video indexing scheme for content analysis. According to the invention, a database of images or videos is compressed. By examining patterns in the compression scheme of each image or video, the present invention identifies the content of the data. In one embodiment, an unsupervised learning method is employed where each image or video is sub-divided into smaller blocks (8 pixels×8 pixels, for instance) and each of the smaller blocks is examined for its compression pattern. Then, the pattern associated with each of the smaller blocks is recorded for each of the images in the database and content is retrieved from the database by associating certain patterns or groups of patterns with certain content.

In one embodiment, the compression patterns for each of the subdivided blocks of the images or videos comprise a collection of transform codes. The transform codes are the codes used to compress the block into the fewest bits possible. The transformed codes are obtained via the unsupervised learning method that takes place across a database where the images and videos reside. The collection of transform codes is used to build a dictionary that provides a probabilistic description of the data that is suitable for content-based retrieval. The bit-stream is organized to support its progressive decoding.

In one embodiment, the unsupervised learning method finds the transform codes for the dictionary based upon latent variable modeling, which is adopted to learn a collection, or mixture, of local linear subspaces over a set of image patches or blocks. In one embodiment, Gaussian latent variable modeling defines a proper probability density model over the input space, and concurrently performs a data partitioning and a reduction step within a maximum likelihood framework.

In one embodiment, a user is able to query the database of images and videos by either submitting an input image for retrieval or specifying a type of content to be retrieved. If the type of content to be retrieved is specified, then images with sets of compression patterns associated with the content are retrieved. If an input image is submitted, a set of compression patterns (e.g., transform codes) is obtained for the input image and matched with the sets of transform codes for the images in the database. To determine if the transform codes for the input and database images match, an optimal Bayes decision rule is used by one embodiment of the present invention.

BRIEF DESCRIPTION OF THE DRAWINGS

These and other features, aspects and advantages of the present invention will become better understood with regard to the following description, appended claims and accompanying drawings where:

DETAILED DESCRIPTION OF THE INVENTION

The invention relates to an image and video indexing scheme for content analysis. In the following description, numerous specific details are set forth to provide a more thorough description of embodiments of the invention. It is apparent, however, to one skilled in the art, that the invention may be practiced without these specific details. In other instances, well known features have not been described in detail so as not to obscure the invention.

Image and Video Indexing Scheme

Figure 1:
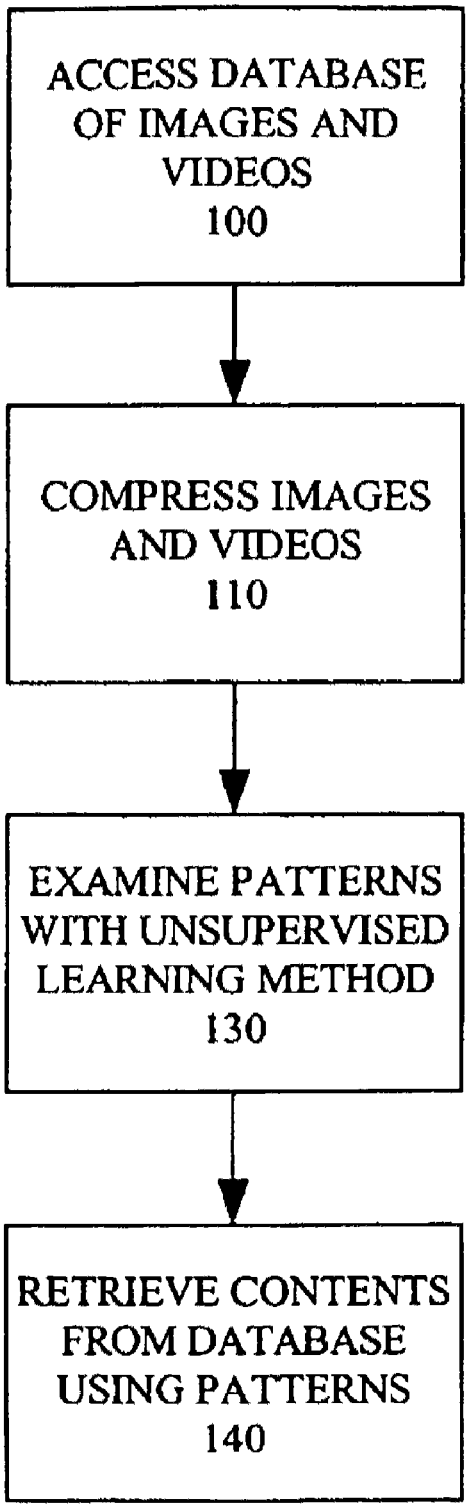
FIG. 1 is a flow diagram illustrating one embodiment of the present invention.

According to the invention, a database of images or videos is compressed. By examining patterns in the compression scheme of each image or video, the present invention identifies the content of the data. FIG. 1 is a flowchart showing this embodiment of the present invention. At block 100, a database of images and videos are obtained. At block 110, the images and videos are compressed. At block 130, patterns in the compression of each image or video are examined using an unsupervised learning method. At block 140, content is retrieved from the database using the compression patterns.

Unsupervised Learning Method

In one embodiment, an unsupervised learning method is employed for is used to examine patterns in the source image. In the method of this embodiment, each image or video is sub-divided into smaller blocks (8 pixels×8 pixels, for instance) and each of the smaller blocks is examined for its compression pattern. Then, the patterns associated with each of the smaller blocks is recorded for each of the images in the database and content is retrieved from the database from the database by associating certain patterns or groups of patterns with certain content.

Figure 2:
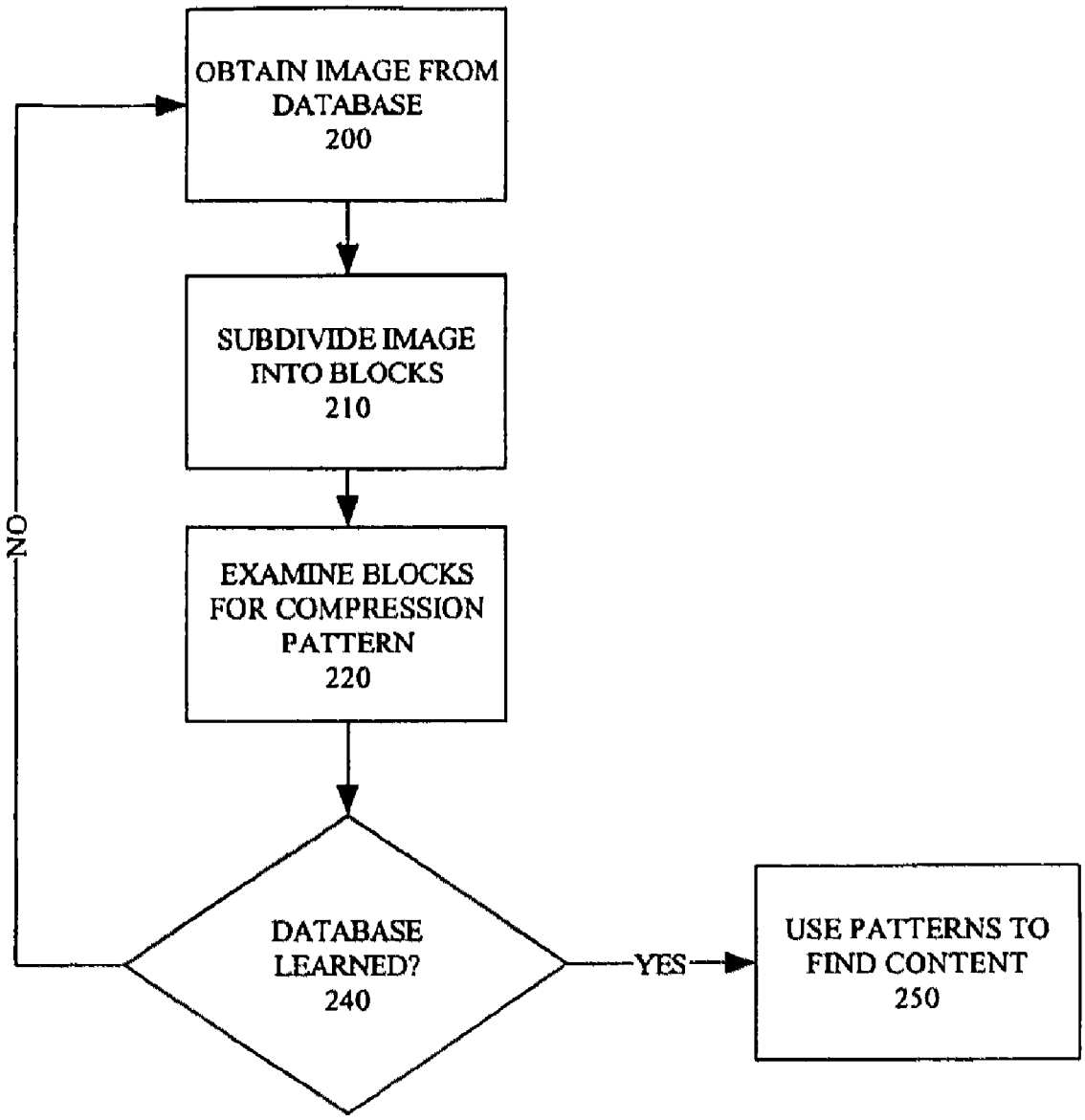
FIG. 2 is a flow chart illustrating the operation of one embodiment of the invention.

FIG. 2 is a flowchart showing this embodiment of the present invention. At block 200, an image or video is obtained from the database. At block 210, the image is sub-divided into smaller blocks (8 pixels×8 pixels, for instance). At block 220, each of the smaller blocks is examined for its compression pattern. At block 230, the patterns associated with each of the smaller blocks is recorded. At block 240, it is determined if all of the images or videos in the database have been learned. If not, the process repeats at block 200. Otherwise, content is retrieved from the database at block 250 by associating certain patterns or groups of patterns with certain content.

In one embodiment, the compression patterns for each of the subdivided blocks of the images or videos comprise a collection of transform codes. The transform codes are the codes used to compress the block into the fewest bits possible. The transform codes are obtained via the unsupervised learning method that takes place across a database where the images and videos reside. The collection of transform codes are used to build a dictionary that provides a probabilistic description of the data that is suitable for content-based retrieval. The bit-stream is organized to support its progressive decoding.

Figure 3:
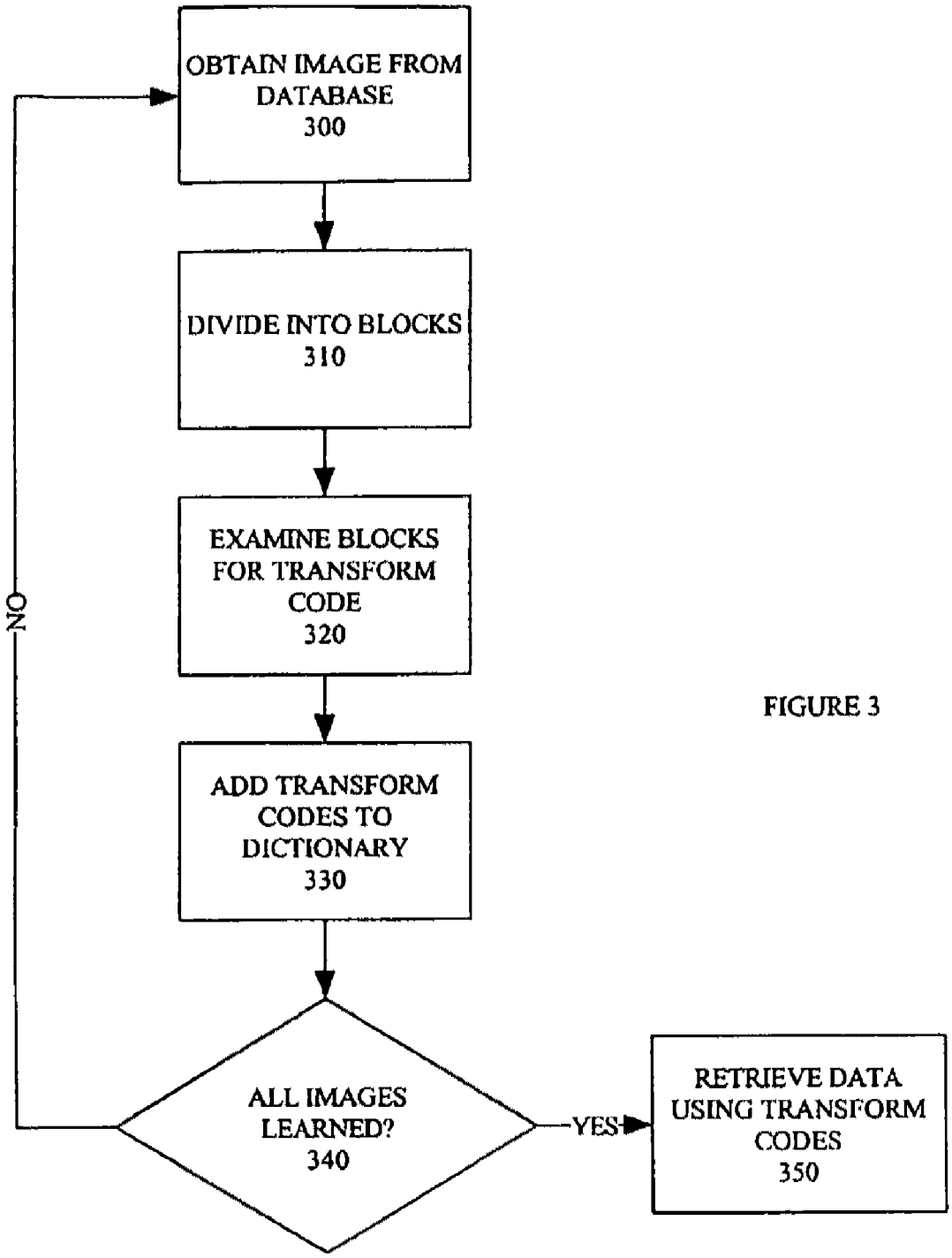
FIG. 3 is a flow diagram illustrating progressive decoding.

FIG. 3 is a flowchart showing this embodiment of the present invention. At block 300, an image or video is obtained from the database. At block 310, the image is sub-divided into smaller blocks. At block 320, each of the smaller blocks is examined for the transform code used to optimally compress the block. At block 330, the learned transform codes are added to a dictionary. At block 340, it is determined if all of the images or videos in the database have been learned. If not, the process repeats at block 300. Otherwise, content is retrieved from the database at block 350 by associating certain transform codes or groups of transform codes with certain content.

Latent Variable Modeling

Figure 4:
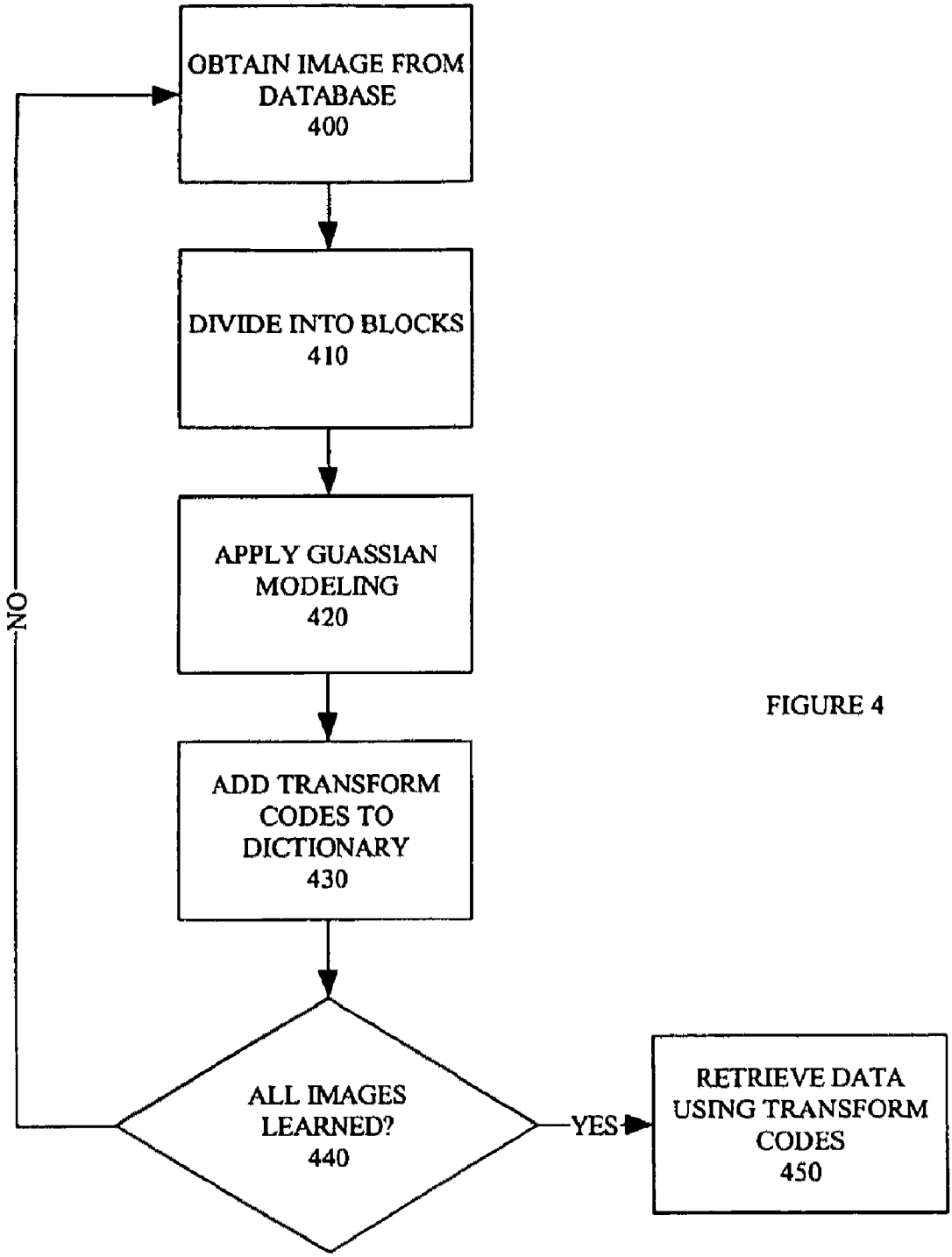
FIG. 4 is a flow diagram illustrating data partitioning.

In one embodiment, the unsupervised learning method finds the transform codes for the dictionary based upon latent variable modeling, which is adopted to learn a collection, or mixture, of local linear subspaces over a set of image patches or blocks. In one embodiment, Gaussian latent variable modeling defines a proper probability density model over the input space, and concurrently performs a data partitioning and a reduction step within a maximum likelihood framework FIG. 4 is a flowchart showing this embodiment of the present invention. At block 400, an image or video is obtained from the database. At block 410, the image data is partitioned into smaller blocks. At block 420, each of the smaller blocks has Gaussian latent variable modeling applied to them to obtain the transform code used to optimally compress the block At block 430, the learned transform codes are added to a dictionary. At block 440, it is determined if all of the images or videos in the database have been learned. If not, the process repeats at block 400. Otherwise, content is retrieved from the database at block 450 by associating certain transform codes or groups of transform codes with certain content.

User Query

Figure 5:
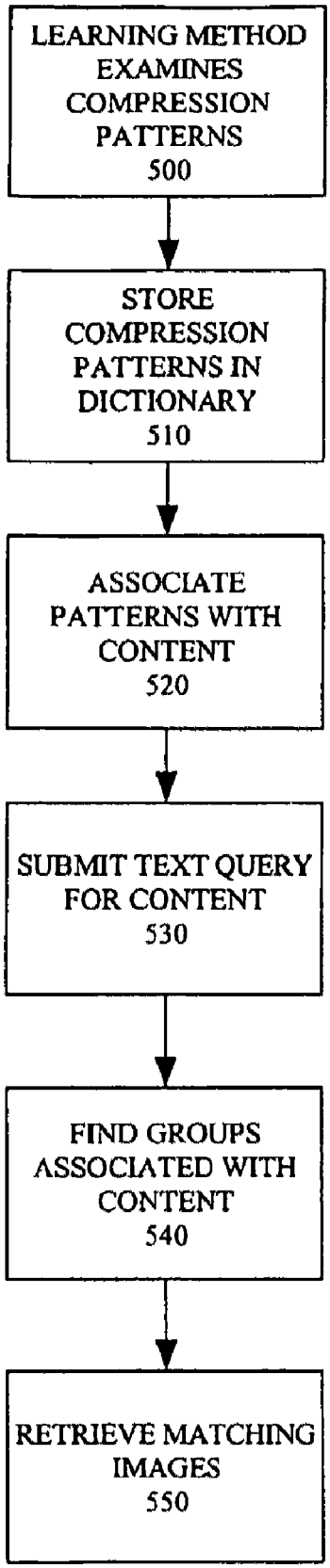
FIG. 5 is a flow diagram illustrating image retrieval.

In one embodiment, a user is able to query the database of images and videos by either submitting an input image for retrieval or specifying a type of content to be retrieved. If the type of content to be retrieved is specified, then images with sets of compression patterns associated with the content are retrieved. An example of this embodiment of the present invention is shown in FIG. 5.

At block 500, the unsupervised learning method examines the compression patterns of all of the images or videos in the database. At block 510, all of the compression patterns are stored in a dictionary. At block 520, certain groups of compression patterns are associated with certain types of content in the dictionary. At block 530, a user submits a text query for content (i.e., a dog). At block 540 all of the groups of compression patterns associated with the content (i.e., the dog) are found in the dictionary. At block 550, all of the images or videos in the database that have compression patterns that match the compression patterns for the content are retrieved.

In another embodiment, a user searches the database by providing an input image. When the input image is submitted, a set of compression patterns (e.g., transform codes) is obtained for the input image and matched with the sets of transform codes for the images in the database. To determine if the transform codes for the input and database images match closely enough, an optimal Bayes decision rule is used by one embodiment of the present invention.

Figure 6:
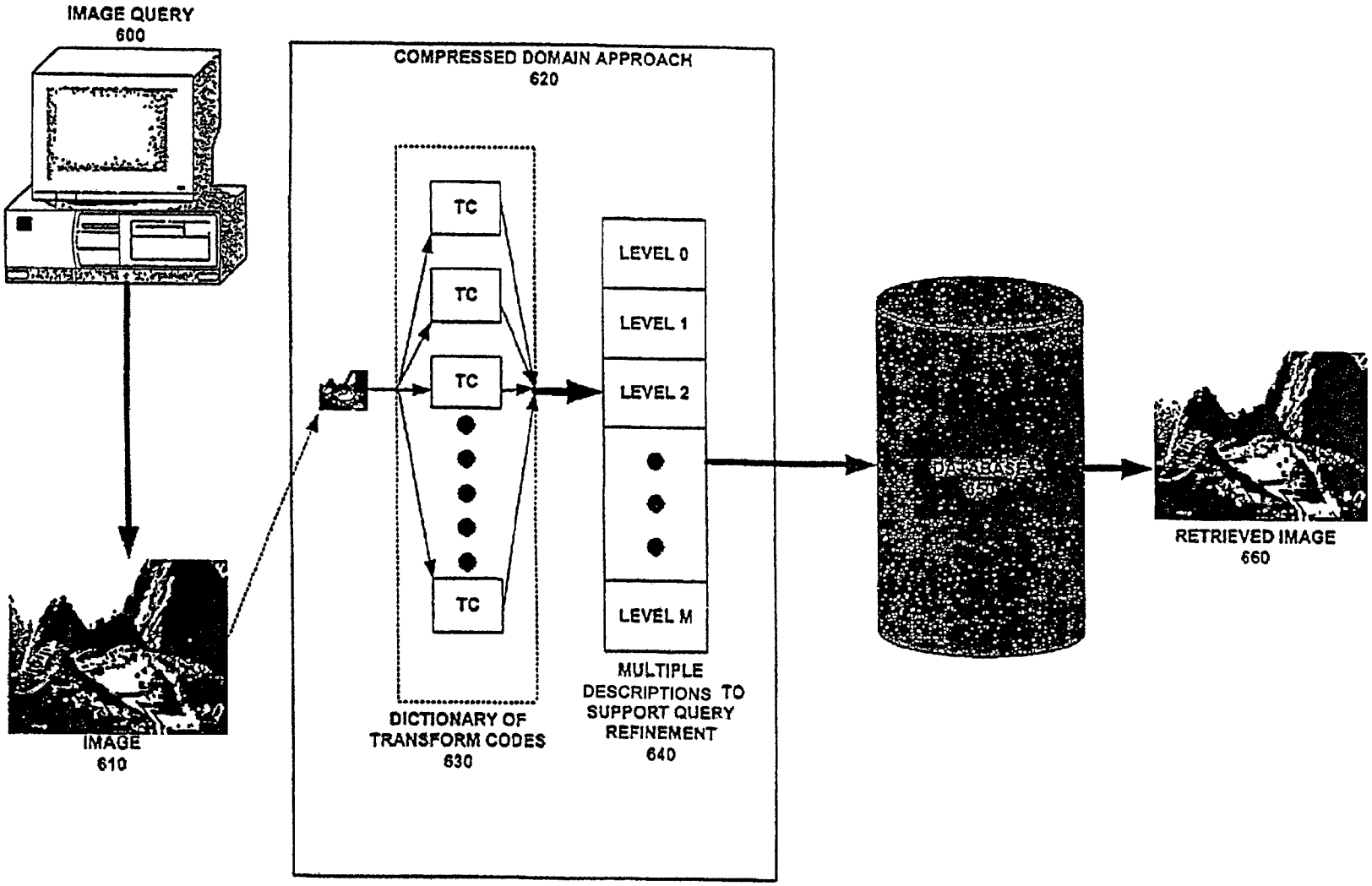
FIG. 6 is a block diagram of an embodiment of the present invention that uses an image-based user query.

FIG. 6 is a block diagram of an embodiment of the present invention that uses an image-based user query. An image query 600 is obtained from a user. The image query is designed to retrieve image 610. Image 610 based on the query is transferred to compressed domain 620 where it first is passed to a dictionary of transform codes 630. Next, multiple descriptions 640 are used to support query refinement. Next the information is passed to a database 650 and the retrieved image 660 is obtained.

Figure 7:
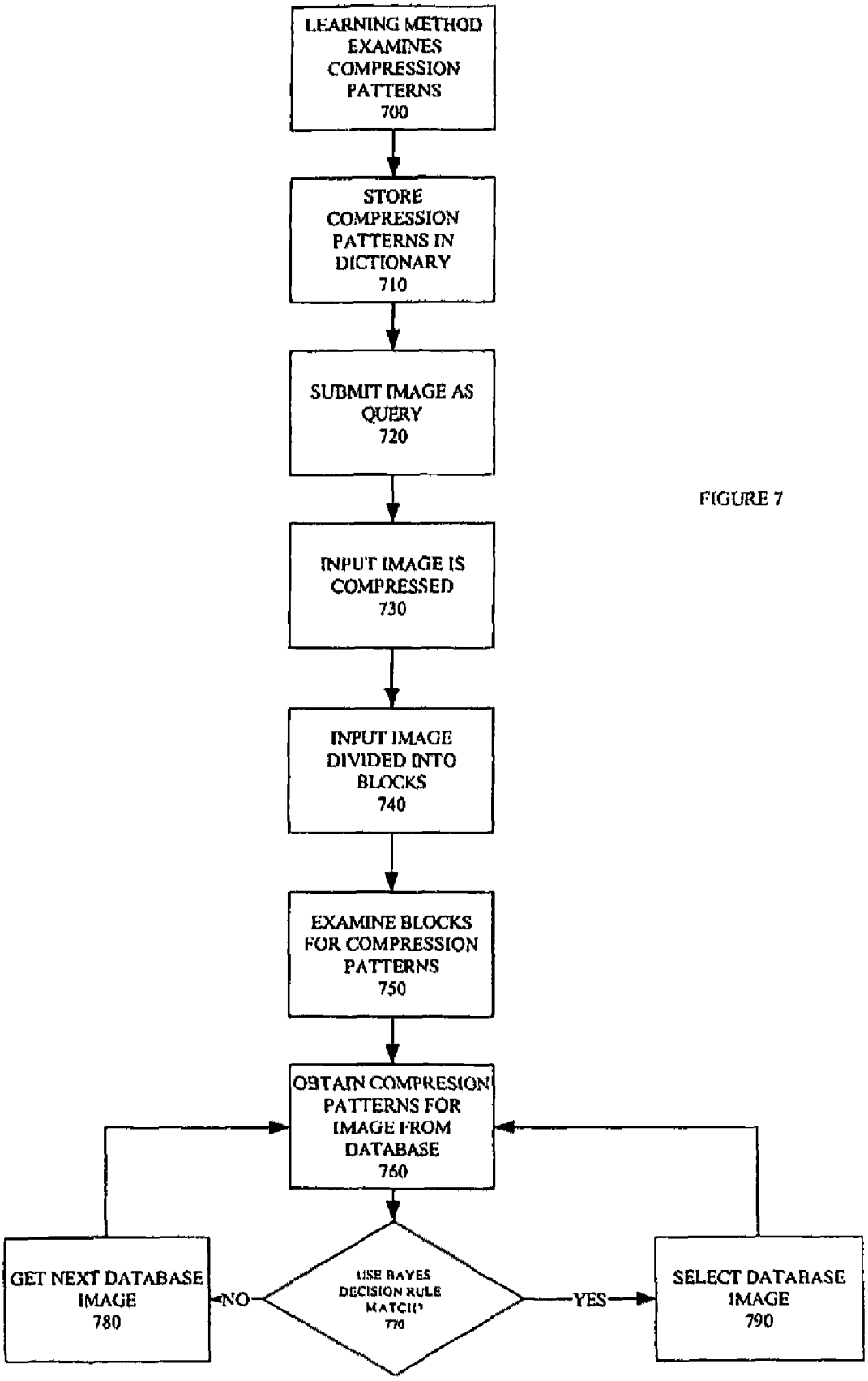
FIG. 7 is a flowchart showing a process according to an embodiment of the present invention.

FIG. 7 is a flowchart showing a process according to an embodiment of the present invention. At block 700, the unsupervised learning method examines the compression patterns of all of the images or videos in the database. At block 710, all of the compression patterns are stored in a dictionary. At block 720, a user submits an image as a query for content. At block 730 the input image is compressed. At block 740, the input image is subdivided into blocks. At block 750, the blocks are examined for their compression patterns.

At block 760, the compression patterns for an image or video in the database is obtained. At block 770, Bayes decision rule is used to determine whether the patterns in the database image or video are matched closely enough to the patterns in the input image. If not, then at block 780, the next image or video is obtained and block 760 repeats. Otherwise, at block 790, the database image or video is selected and block 760 repeats.

Gaussian Latent Variable Modeling

In one embodiment, the unsupervised learning method uses Gaussian latent variable modeling. Gaussian latent variable modeling assumes that the high-dimensional observed space ($\chi$) is generated from a low-dimensional process defined by linear transformation latent variables, or hidden causes ($\dot{Z}$), plus an additive noise ($\mu$):

$$\chi = T\dot{Z} + \mu + \epsilon$$

where the columns of T are the basis functions, and the latent variables and noise are defined as:

$$\dot{Z} \sim N((0,I)\ \epsilon \sim N((\mathbf{0},\Psi)$$

The observation vectors are also normally distributed.

$$\chi \sim N((\mu, TT', +\Psi)$$

The goal is to find the T and $\Psi$ that best model the covariance structure of $\chi$.

EM Learning of Model Parameters

In one embodiment, the learning process according to the present invention comprises an E step and an M step. The E step computes the moments $E[z|x_i, w_j]$ and $E[zz'|x_i, w_j]$ for all data points i and mixture components j given the current parameter values $\Lambda j$, and $\Psi j$.

$$h_{ij} = \pi_j N(x_i - \mu_j, \Lambda_j, \Lambda'_j + \Psi)$$

$$E[w_j Z | x_i] = h_{ij} \beta_j (x_i - \mu_j)$$

$$\beta_j = \Lambda'_j (\Psi + \Lambda_j \Lambda'_j)^{-1}$$

$$E[w_j zz' x_i] = h_{ij}(I - \beta_{j\Lambda j} + \beta_j (x_i - \mu_j)(x_i - \mu_j)' \beta'_j$$

The M step results in the following update equations for the parameters:

$$\Lambda_j^{new} \mu_j^{new}] = \left( \sum_i h_{ij} x_i E[\tilde{z} \mid x_i, w_j] \right) \left( \sum_i h_{ij} E[\tilde{z}\tilde{z} \mid x_i, w_j] \right)^{-1}$$

$$\Psi_j^{new} = \frac{1}{n} \operatorname{diag} \left\{ \sum_{ij} h_{ij} (x_i - \bar{\Lambda}_j^{new} E[\tilde{z} \mid x_i, w_j]) x_i' \right\}$$

$$\mu_j^{new} = \frac{1}{n} \sum_{i=1}^{n} h_{ij}$$

Universal Statistical Coding

The Expectation Maximization (EM) algorithm is used to learn the parameters of a mixture of Gaussian linear subspaces (our dictionary of transform codes) for each image band. The final step assigns an image block to the mixture component yielding the lowest reconstruction error. Different bit allocation matrices are learned for each transform basis, and the quantized coefficients are entropy encoded using an arithmetic encoder. Bayesian inference methods may be applied for image matching.

Coefficient Matching Via Bayesian Evidential Reasoning

Figure 8:
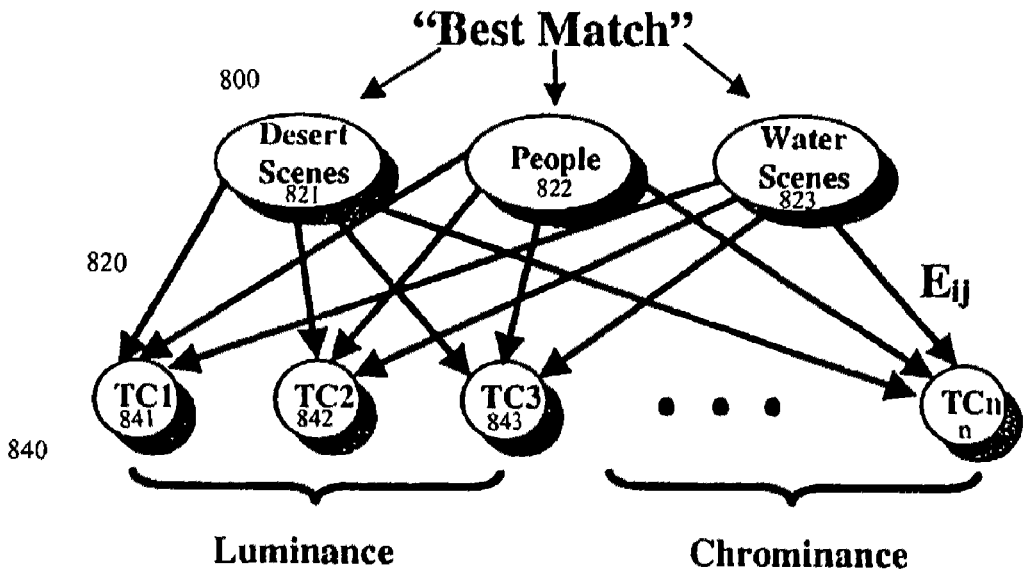
FIG. 8 is a diagram illustrating Bayesian evidential reasoning.

FIG. 8 illustrates coefficient matching using Bayesian evidential reasoning. At the top level 800 a hypothesis H having the greatest probability given all the accumulated evidence is made. Level 820 represents some images that night exist in a database such as desert scenes 821, people 822, and water scenes 823. Here the belief in Hypothesis $H_i$ taking Evidence E into Account is tested. From level 820 to 840 $E_{ij}$ is evidence concerning hypothesis $H_j$ from information source $S_j$. used to generate luminance nodes 841-843 and chrominance nodes up to n.

Bayesian Reasoning:

Uses an "Odds—Likelihood Ratio" formulation of Bayes' rule, and assumes that evidence i are statistically

| | |
|---|---|
| Prior | O(H) = P(H)/ |
| Likelihood | i(H) = P($E_i$\|H)/P($E_i$\|-H) |
| Posteri | |
| A Posteriori Probability | $P(H \mid 1, \ldots, E_n) = \frac{O(H \mid E_1, \ldots, E_n)}{1 + O(H \mid E_1, \ldots, E_n)}$ |

Experimental Results

Experiment 1—WUTC Vs. Universal Statistical Coder (Vis Tex) collection images were subdivided into 9 128×128 images using 5 for training, and 4 for testing. Matching only code usage histograms, and compressing to 0.4 bpp.

| | | |
|---|---|---|
| WUTC | 78% | Correct Retrieval |
| UStatC | 95% | Correct Retrieval |

Experiment 2—Uncompressed Vs. Compressed Domain Matching 5 real world image classes: birds, deserts, flowers, people, and water scenes, with 10 images/class.

| | | |
|---|---|---|
| Color Histograms | 76% | Correct, Full Decompression |
| Level Zero Histograms | 72% | Correct, (<35%) Decompression |
| Matching 1st 5 Coeffs. | 94% | Correct, Partial Decompression |

Object Detection

This research addresses the problem of object detection in complex scenes, where the focus will be on detecting subclasses of animals from still imagery.

The challenges are:

image content may not be unique.

objects may be partially occluded or have part that blend with the background.

high degree of within class variation (e.g., type or breed, color, size, etc.)

variations due to background clutter, illumination, translations, scale, and 3D pose.

System Block Diagram

Figure 9:
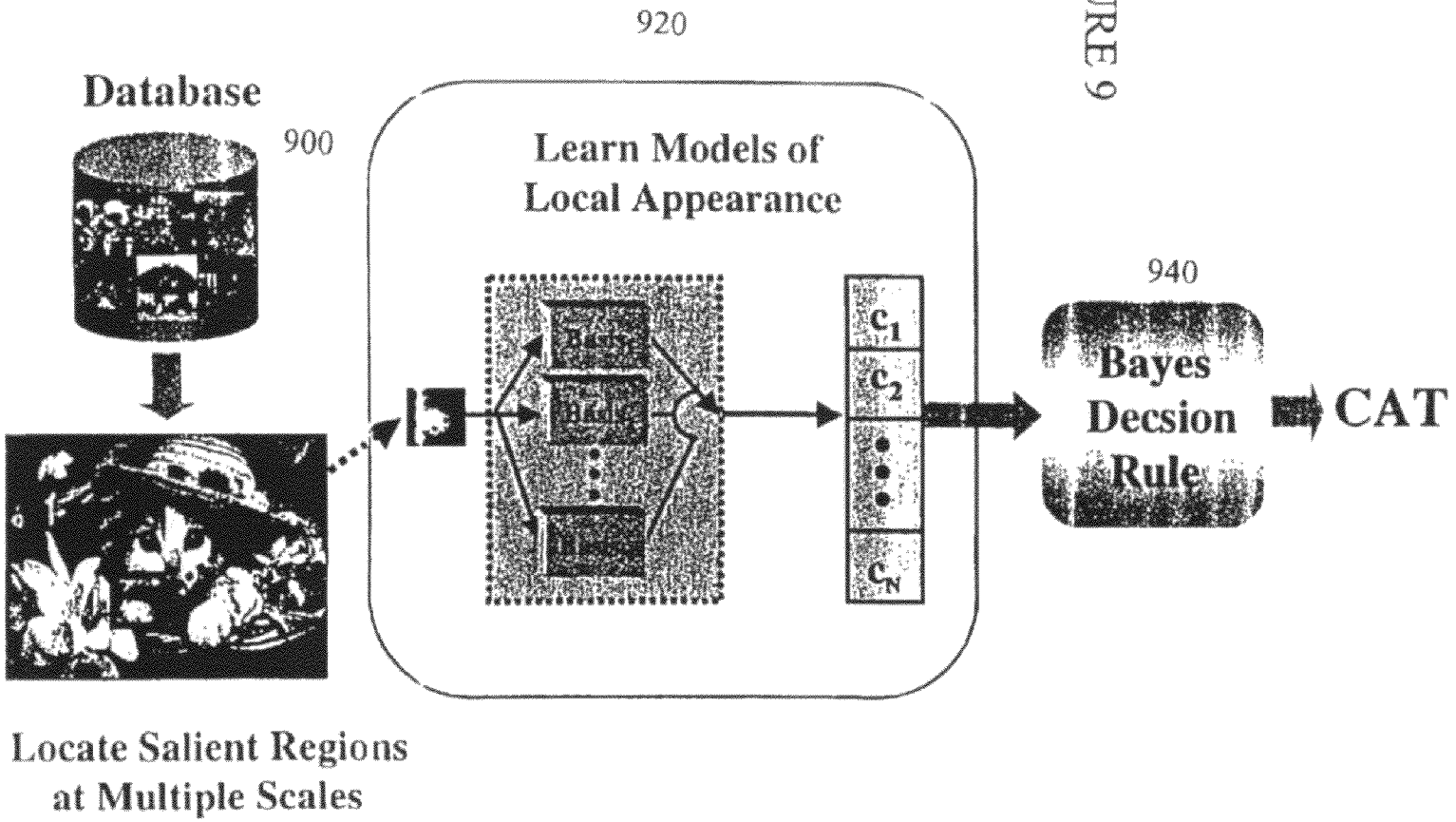
FIG. 9 is a block diagram of a system for object detection.

A block diagram of a system for object detection is illustrated in FIG. 9. Database 900 stores a plurality of images. In each image salient regions are located at multiple scales. These become the searchable objects. These regions are provided to the learning system 920 and passed through a Bayes decision rule module 940.

Object Recognition by Probabilistic Appearance Modeling

Using a mixture of factor analyzers framework (MFA), the clustering and dimensionality reduction steps are performed simultaneously within a maximum-likelihood framework Approach:

Convert RGB to YCrCB) luminance and chrominance bands.

For each training image, find and extract salient subregions (8×8) within each band and at multiple scales.

Learn a collection of subspaces within an MFA framework

The MFA model explicitly estimates the probability density of the class over the pattern space.

Bayes decision rule is used to decide the class.

Detection of Salient Points

Interest points are local features at which the signal changes two dimensionally. The following matrix is computed in a local neighborhood around the point:

$C=[\Sigma I_x \Sigma I_x I_y]$ compute the eigenvalues of $C[\Sigma_x I_y \Sigma I_x^2$ and test if $\lambda_1>\lambda_2>$constant Comparison of Methods 100 images (50 per class) were used for training, and the same number for testing.

| Confusion Matrix | Cats | Dogs | |
|---|---|---|---|
| MFA Local Appearance Modeling | | | |
| Cats | 48 | 2 | 92% |
| Dogs | 6 | 44 | Correct |

-continued

| Confusion Matrix | Cats | Dogs | |
|---|---|---|---|
| Perceptual Color Histograms | | | |
| Cats | 41 | 9 | 84% |
| Dogs | 7 | 43 | Correct (equation) |

Embodiment of Computer Execution Environment (Hardware)

Figure 10:
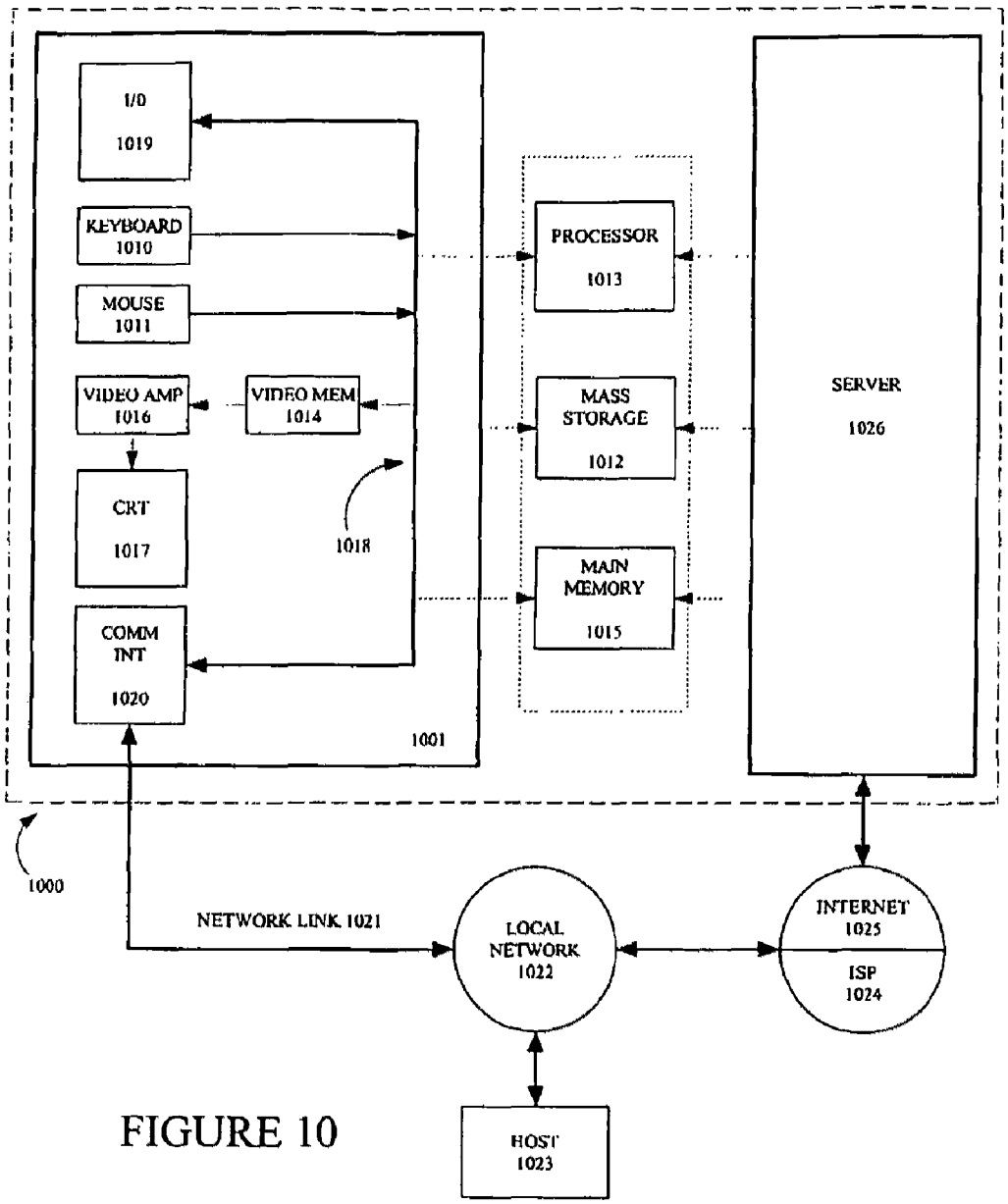
FIG. 10 is a block diagram of a general purpose computing environment.

An embodiment of the invention can be implemented as computer software in the form of computer readable program code executed in a general purpose computing environment such as environment 1000 illustrated in FIG. 10, or in the form of bytecode class files executable within a Java™ run time environment running in such an environment, or in the form of bytecodes running on a processor (or devices enabled to process bytecodes) existing in a distributed environment (e.g., one or more processors on a network). A keyboard 1010 and mouse 1011 are coupled to a system bus 1018. The keyboard and mouse are for introducing user input to the computer system and communicating that user input to central processing unit (CPU 1013. Other suitable input devices may be used in addition to, or in place of, the mouse 1011 and keyboard 1010. I/O (input/output) unit 1019 coupled to bidirectional system bus 1018 represents such I/O elements as a printer, A/V (audio/video) I/O, etc.

Computer 1001 may include a communication interface 1020 coupled to bus 1018. Communication interface 1020 provides a two-way data communication coupling via a network link 1021 to a local network 1022. For example, if communication interface 1020 is an integrated services digital network (ISDN) card or a modem, communication interface 1020 provides a data communication connection to the corresponding type of telephone line, which comprises part of network link 1021. If communication interface 1020 is a local area network (LAN) card, communication interface 1020 provides a data communication connection via network link 1021 to a compatible LAN. Wireless links are also possible. In any such implementation, communication interface 1020 sends and receives electrical, electromagnetic or optical signals which carry digital data streams representing various types of information.

Network link 1021 typically provides data communication through one or more networks to other data devices. For example, network link 1021 may provide a connection through local network 1022 to local server computer 1023 or to data equipment operated by ISP 1024. ISP 1024 in turn provides data communication services through the world wide packet data communication network now commonly referred to as the "Internet" 1025. Local network 1022 and Internet 1025 both use electrical, electromagnetic or optical signals which carry digital data streams. The signals through the various networks and the signals on network link 1021 and through communication interface 1020, which carry the digital data to and from computer 1000, are exemplary forms of carrier waves transporting the information.

Processor 1013 may reside wholly on client computer 1001 or wholly on server 1026 or processor 1013 may have its computational power distributed between computer 1001 and server 1026. Server 1026 symbolically is represented in FIG. 10 as one unit, but server 1026 can also be distributed between multiple "tiers". In one embodiment, server 1026 comprises a middle and back tier where application logic executes in the middle tier and persistent data is obtained in the back tier. In the case where processor 1013 resides wholly on server 1026, the results of the computations performed by processor 1013 are transmitted to computer 1001 via Internet 1025, Internet Service Provider (ISP) 1024, local network 1022 and communication interface 1020. In this way, computer 1001 is able to display the results of the computation to a user in the form of output.

Computer 1001 includes a video memory 1014, main memory 1015 and mass storage 1012, all coupled to bi-directional system bus 1018 along with keyboard 1010, mouse 1011 and processor 1013.

As with processor 1013, in various computing environments, main memory 1015 and mass storage 1012, can reside wholly on server 1026 or computer 1001, or they may be distributed between the two. Examples of systems where processor 1013, main memory 1015, and mass storage 1012 are distributed between computer 1001 and server 1026 include the thin-client computing architecture developed by Sun Microsystems, Inc., the palm pilot computing device and other personal digital assistants, Internet ready cellular phones and other Internet computing devices, and in platform independent computing environments, such as those which utilize the Java technologies also developed by Sun Microsystems, Inc.

The mass storage 1012 may include both fixed and removable media, such as magnetic, optical or magnetic optical storage systems or any other available mass storage technology. Bus 1018 may contain, for example, thirty-two address lines for addressing video memory 1014 or main memory 1015. The system bus 1018 also includes, for example, a 32-bit data bus for transferring data between and among the components, such as processor 1013, main memory 1015, video memory 1014 and mass storage 1012. Alternatively, multiplex data/address lines may be used instead of separate data and address lines.

In one embodiment of the invention, the processor 1013 is a microprocessor manufactured by Motorola, such as the 680X0 processor or a microprocessor manufactured by Intel, such as the 80X86, or Pentium processor, or a SPARC microprocessor from Sun Microsystems, Inc. However, any other suitable microprocessor or microcomputer may be utilized. Main memory 1015 is comprised of dynamic random access memory (DRAM). Video memory 1014 is a dual-ported video random access memory. One port of the video memory 1014 is coupled to video amplifier 1016. The video amplifier 1016 is used to drive the cathode ray tube (CRT) raster monitor 1017. Video amplifier 1016 is well known in the art and may be implemented by any suitable apparatus. This circuitry converts pixel data stored in video memory 1014 to a raster signal suitable for use by monitor 1017. Monitor 1017 is a type of monitor suitable for displaying graphic images.

Computer 1001 can send messages and receive data, including program code, through the network(s), network link 1021, and communication interface 1020. In the Internet example, remote server computer 1026 might transmit a requested code for an application program through Internet 1025, ISP 1024, local network 1022 and communication interface 1020. The received code maybe executed by processor 1013 as it is received, and/or stored in mass storage 1012, or other non-volatile storage for later execution. In this manner, computer 1000 may obtain application code in the form of a carrier wave. Alternatively, remote server computer 1026 may execute applications using processor 1013, and utilize mass storage 1012, and/or video memory 1015. The results of the execution at server 1026 are then transmitted through Internet 1025, ISP 1024, local network 1022 and communication interface 1020. In this example, computer 1001 performs only input and output functions.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer bard drives, servers on a network, and carrier waves.

The computer systems described above are for purposes of example only. An embodiment of the invention may be implemented in any type of computer system or programming or processing environment.

Thus, a method and apparatus for indexing images and video is described in conjunction with one or more specific embodiments. The invention is defined by the claims and their full scope of equivalents.

The invention claimed is:

1. A method for retrieving one or more output images, the method comprising:

building a learned dictionary of transform codes by examining images in a database for one or more compression patterns and recording said compression patterns in the learned dictionary, wherein the one or more compression patterns comprise one or more transform codes that are learned from the images in the database;

receiving a request for one or more output images;

transforming the requested output images into requested transform codes; and retrieving said output images from the database by comparing the requested transform codes to the learned transform codes.

2. The method of claim 1, wherein said receiving a request comprises:

receiving a text input;

locating one or more compression patterns associated with said text input; and retrieving said output images associated with said compression patterns.

3. The method of claim 1, wherein said receiving a request comprises:

receiving an input image;

transforming the input image into input transform codes; comparing said input transform codes to the learned transform codes; and retrieving said output images from the database by comparing the input transform codes to the learned transform codes.

4. The method of claim 1, wherein said examining images in the database comprises: dividing said images into one or more blocks; and obtaining compression patterns by examining said blocks.

5. The method of claim 1 further comprising: applying a latent variable modeling technique to obtain said transform codes.

6. The method of claim 5, wherein said latent variable modeling is a Gaussian latent variable modeling.

7. The method of claim 1, wherein retrieving said output images further comprises: applying a Bayes decision rule.

8. A system for retrieving one or more output images, the system comprising:

one or more images in a database, wherein the images are configured to be examined for one or more compression patterns, wherein the one or more compression patterns comprise one or more transform codes that are learned from the images in the database;

a learned dictionary built from the transform codes learned from the images in the database by recording said compression patterns;

means for receiving a request for one or more output images;

means for transforming the requested output images into requested transform codes; and means for retrieving said output images from the database by comparing the requested transform codes to the learned transform codes.

9. The system of claim 8, wherein said means for receiving a request comprises:

means for receiving a text input, wherein one or more compression patterns are associated with said text input and are locatable using said text input, and wherein said output images are associated with said compression patterns and are retrievable using said compression patterns.

10. The system of claim 9, wherein said means for receiving a request comprises:

means for receiving an input image, wherein said input image is transformed into input transform codes, wherein said input transform codes are compared to the learned transform codes, and wherein said output images are retrieved by comparing the input transform codes to the learned transform codes.

11. The system of claim 8, wherein said images are divided into one or more blocks; and said compression patterns are obtained by examining said blocks.

12. The system of claim 8, wherein a latent variable modeling technique is used to obtain said transform codes.

13. The system of claim 12, wherein said latent variable modeling is a Gaussian latent variable modeling.

14. The system of claim 8, wherein a Bayes decision rule is applied to retrieve said output images.

15. A *non-transitory* computer program product comprising a computer [usable] *readable* medium having computer readable program code embodied therein configured to obtain one or more output images, said computer program product comprising:

computer readable code for building a learned dictionary of transform codes by examining images in a database for one or more compression patterns and recording said compression patterns in the learned dictionary, wherein the one or more compression patterns comprise one or more transform codes that are learned from the images in the database;

computer readable code for receiving a request for one or more output images;

computer readable code for transforming the requested output images into requested transform codes; and computer readable code for retrieving said output images from the database by comparing the requested transform codes to the learned transform codes.

16. The computer program product of claim 15, wherein said computer readable code for receiving a request comprises:

computer readable code for receiving a text input;

computer readable code for locating one or more compression patterns associated with said text input; and computer readable code for retrieving said output images associated with said compression patterns.

17. The computer program product of claim 16, wherein said computer readable code for receiving a request comprises:

computer readable code for receiving an input image;

computer readable code for transforming the input image into input transform codes;

computer readable code for comparing said input transform codes to the learned transform codes; and computer readable code for retrieving said output images from the database by comparing the input transform codes to the learned transform codes.

18. The computer program product of claim 15, wherein said computer readable code for examining images in a database comprises:

computer readable code for dividing said images into one or more blocks; and computer readable code for obtaining said first compression patterns by examining said blocks.

19. The computer program product of claim 15, further comprising: computer readable code for applying a latent variable modeling technique to obtain said transforms codes.

20. The computer program product of claim 19 wherein said latent variable modeling is a Gaussian latent variable modeling.

21. The computer program product of claim 15, wherein said computer readable code for retrieving said output images further comprises: computer readable code for applying a Bayes decision rule.

*22. A method comprising:*

*obtaining, by a computer based system for content analysis, an image or video from a database;*

*subdividing, by the computer based system, the image or video into blocks;*

*examining, by the computer based system, the blocks for transform codes used to compress the blocks; and*

*adding, by the computer based system, one or more of the transform codes to a dictionary that is configured to be used for image retrieval.*

*23. The computer-implemented method of claim 22, wherein said examining comprises using latent variable modeling to find the transform codes.*

*24. The computer-implemented method of claim 22, wherein said examining comprises obtaining compression patterns by examining said blocks.*

*25. The computer-implemented method of claim 22, wherein said examining comprises learning a collection or mixture of local linear subspaces over a set of the blocks.*

*26. The computer-implemented method of claim 22, wherein said examining comprises defining a probability density model over an input space and performing data partitioning and reduction within a maximum likelihood framework.*

*27. A method comprising:*

*obtaining, by a computer based system for content analysis, an image or video from a database;*

*examining, by the computer based system, said image or video by applying Gaussian latent variable modeling to the image or video to obtain a transform code used to compress at least a portion of the image or video; and*

*adding, by the computer based system, the transform code to a dictionary that is configured to be used for image retrieval.*

*28. The computer-implemented method of claim 27, wherein said examining comprises subdividing said image or video into one or more blocks and applying the Gaussian latent variable modeling to the one or more blocks.*

*29. The computer-implemented method of claim 27, wherein the Gaussian latent variable modeling defines a*

*probability density model over an input space and performs data partitioning and reduction within a maximum likelihood framework.*

*30. A method comprising:*

*receiving, by a computer based system for content analysis, a request for one or more output images, the request comprising an input image;*

*transforming, by the computer based system, the input image into requested transform codes;*

*retrieving the one or more output images from a database by comparing the requested transform codes to learned transform codes in a learned dictionary, wherein the learned dictionary includes compression patterns that comprise the learned transform codes associated with the one or more output images in the database.*

*31. The computer-implemented method of claim 30, wherein said retrieving comprises applying a Bayes decision rule.*

*32. A system comprising:*

*a database comprising one or more images, wherein the one or more images embody one or more compression patterns, wherein the one or more compression patterns comprise one or more transform codes that are associated with the one or more images in the database;*

*a learned dictionary comprising the one or more transform codes associated with the one or more images in the database; and*

*wherein the learned dictionary is configured to be used to retrieve output images from the database based upon a comparison of requested transform codes to the one or more transform codes contained in the learned dictionary.*

*33. The system of claim 32, wherein said one or more images are divided into one or more blocks; and*

*said compression patterns are based on said one or more blocks.*

*34. The system of claim 32, wherein said one or more transform codes in the learned dictionary are a function of a latent variable modeling technique applied to aspects of the one or more images.*

*35. The system of claim 32, wherein said one or more transform codes in the learned dictionary are a function of a Gaussian latent variable modeling technique applied to aspects of the one or more images.*

*36. A computer program product comprising a non-transitory computer readable medium having computer readable program code embodied therein that, in response to execution by a computing device, perform operations comprising:*

*obtaining an image or video from a database;*

*subdividing the image or video into blocks;*

*examining the blocks for transform codes used to compress the blocks; and*

*adding one or more of the transform codes to a dictionary that is configured to be used for image retrieval.*

*37. The computer program product of claim 36 further comprising computer readable program code that, in response to execution by a computing device, perform operations further comprising applying a latent variable modeling technique to obtain said transform codes.*

*38. The computer program product of claim 36 further comprising computer readable program code that, in response to execution by a computing device, perform operations further comprising applying Gaussian latent variable modeling to obtain said transform codes.*

*39. A non-transitory computer program product comprising a computer readable medium having computer readable program code embodied therein that, in response to execution by a computing device, perform operations comprising:*

*receiving a request for one or more output images, the request comprising an input image;*

*transforming the input image into requested transform codes; and*

*retrieving the one or more output images from a database by comparing the requested transform codes to learned transform codes in a learned dictionary, wherein the learned dictionary includes compression patterns that comprise the learned transform codes associated with the one or more output images in the database.*

*40. A system comprising:*

*means for obtaining an image or video from a database;*

*means for subdividing the image or video into blocks;*

*means for examining the blocks for transform codes used to compress the blocks; and*

*means for adding one or more of the transform codes to a dictionary that is configured to be used for image retrieval.*

*41. The system of claim 40, wherein said means for examining comprises means for using latent variable modeling to find the transform codes.*

*42. The system of claim 40, wherein said means for examining comprises means for obtaining compression patterns by examining said blocks.*

*43. The system of claim 40, wherein said means for examining comprises means for learning a collection or mixture of local linear subspaces over a set of the blocks.*

*44. The system of claim 40, wherein said means for examining comprises means for defining a probability density model over an input space and means for performing data partitioning and reduction within a maximum likelihood framework.*

*45. A system comprising:*

*means for obtaining an image or video from a database:*

*means for examining said image or video by applying Gaussian latent variable modeling to the image or video to obtain a transform code used to compress at least a portion of the image or video; and*

*means for adding the transform code to a dictionary that is configured to be used for image retrieval.*

*46. The system of claim 45, wherein said means for examining comprises means for subdividing said image or video into one or more blocks and means for applying the Gaussian latent variable modeling to the one or more blocks.*

*47. The system of claim 45, wherein means for examining comprises means for defining a probability density model over an input space and means for performing data partitioning and reduction within a maximum likelihood framework.*

*48. A system comprising:*

*means for receiving a request for one or more output images, the request comprising an input image;*

*means for transforming the input image into requested transform codes;*

*means for retrieving the one or more output images from a database by comparing the requested transform codes to learned transform codes in a learned dictionary, wherein the learned dictionary includes compression patterns that comprise the learned transform codes associated with the one or more output images in the database.*

*49. The system of claim 48, wherein said means for retrieving comprises means for applying a Bayes decision rule.*

* * * * *